United States Patent

Jackson, Jr. et al.

Patent Number: 4,596,866
Date of Patent: Jun. 24, 1986

[54] POLY(UREA-AMIDE) FROM M-XYLYLENEDIAMINE

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 670,717

[22] Filed: Nov. 13, 1984

[51] Int. Cl.$^4$ .................. C08G 69/26; C08G 71/02
[52] U.S. Cl. .................. 528/347; 428/474.4; 428/475.5; 528/335; 528/370
[58] Field of Search .................. 528/347, 335, 370

[56] References Cited

U.S. PATENT DOCUMENTS 3,534,001  10/1970  Bouboulis et al. .................. 528/336

Primary Examiner—Harold D. Anderson
Attorney, Agent, or Firm—Donald W. Spurrell; J. Frederick Thomsen

[57] ABSTRACT

Poly(urea-amides) having an inherent viscosity (I.V.) of 0.4 to about 1.2, and having the repeating units

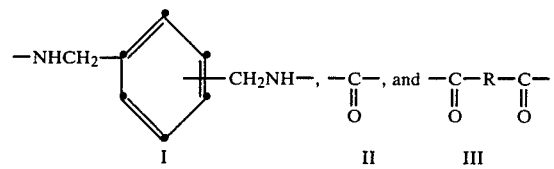

wherein with respect to the total moles of II and III, the mol % of II is 5 to 80, preferably 20 to 60, and conversely the mol % of III is 20 to 95, preferably 40 to 80, R is straight chain alkylene of 3 to 10 carbons, preferably 4 carbons, with the proviso that when R contains 3 carbons, not over 50 mol % thereof is present, up to 40 mol %, preferably 0 mil % of R is aromatic, and wherein up to 30 mol %, preferably 0 mol % of I is the para isomer, the remainder being the meta isomer, are valuable for the manufacture of plastics, fibers, films and other shaped objects, especially multilayer laminated structures which have excellent resistance to the transmission of oxygen, carbon dioxide, and other gases.

6 Claims, No Drawings

POLY(UREA-AMIDE) FROM M-XYLYLENEDIAMINE

This invention concerns poly(urea-amides), particularly those having low permeability to gases including water vapor and which are linear of high molecular weight and derived from m-xylylenediamine, straight chain aliphatic dicarboxylic acids and diaryl carbonates, and having an inherent viscosity (I.V.) of 0.4 to about 1.2. These polymers are valuable for the manufacture of plastics, fibers, films and other shaped objects, especially multilayer laminated structures which have excellent resistance to the transmission of oxygen, carbon dioxide, and other gases. For such uses, an I.V. of from about 0.6 to about 0.8 is preferred.

Similar poly(urea-amides) are disclosed in U.S. Pat. No. 3,534,001 in which the dicarboxylic acid component is limited to hindered dicarboxylic acids such as 2,2,5,5-tetramethyladipic acid, but these polymers have poorer gas barrier properties and are more expensive than the present polymers which do not contain the methyl substituents.

The poly(urea-amides) have the repeating units

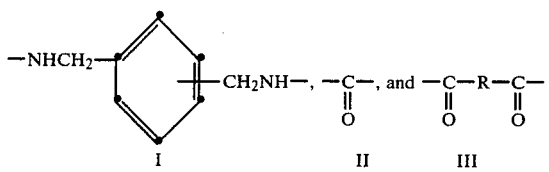

wherein with respect to the total moles of II and III, the mol % of II is 5 to 80, preferably 20 to 60, and conversely the mol % of III is 20 to 95, preferably 40 to 80, R is straight chain alkylene of 3 to 10 carbons, preferably 4 carbons, with the proviso that when R contains 3 carbons, not over 50 mol % thereof is present, or up to 40 mol %, preferably 0 mol % of R is aromatic, and wherein up to 30 mol %, preferably 0 mol % of I is the para isomer, the remainder being the meta isomer.

Examples of useful aliphatic dicarboxylic acids which can be used singly or in admixture are glutaric, pimelic, suberic, azelaic, sebacic, 1,12-dodecanedioic, and preferably adipic. Suitable aromatic dicarboxylic acids include chloroisophthalic, dichloroisophthalic and isophthalic.

Particularly useful and most preferred polymers are obtained in accordance with the present invention wherein the

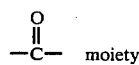 moiety constitutes 20–30 mol %, R is comprised of 0–30 mol % glutaric and 100–70 mol % adipic, and the xylylenediamine is the meta isomer.

The carbonyl moiety II is the residue of a reactive carbonate such as diaryl or dialkyl carbonates, exemplified by diphenyl, dicresyl, dimethyl, diethyl and preferably dibutyl. Many other such useful reactive carbonates are, of course, known in the art.

The present polymers are prepared, for example, by conventional melt-phase polymerization techniques from the m-xylylenediamine, dicarboxylic acid (or acids), and the diaryl or dialkyl carbonate (or carbonates) either in a one-step or two-step process. In the one-step process, the desired polymers are obtained by simply heating m-xylylenediamine, the dicarboxylic acid, and the carbonate at a temperature of from about 175° C. to about 240° C. for a sufficient time to form the pre-polymer and then heating under reduced pressure at about 275° C. to about 295° C. to polycondense to the desired I.V. In the two-step process, the dicarboxylic acid is reacted with the m-xylylenediamine to form an amino-terminated oligomer which is then reacted with the carbonate to form the poly(urea-amide). If the intermediate polymer solidifies during the polycondensation stage, its molecular weight may be increased to the desired value by heating it in particulate form in an inert atmosphere or under reduced pressure at a temperature just below its softening point.

These poly(urea-amides) can easily be processed by conventional melt techniques to yield films with unusually good gas barrier properties. The films are particularly useful as a gas barrier material in the fabrication of multilayer laminated articles wherein the substrate can be of any thickness, but typically several times the thickness of the film, and can cover both sides thereof. These articles may be prepared by various techniques such as lamination in a hot press, casting, use of a hot-melt adhesive, or coextrusion (with or without a coextruded adhesive layer). Composite films can be coextruded from the poly(urea-amides) and one or more conventional polymers to produce structured laminates for a wide variety of end uses such as food packaging. If desired, these coextruded laminates may be combined with other films (e.g., from polymers which cannot be coextruded), paper, and metal foils by physical lamination using, if needed, an adhesive to bond the layers together. Physical lamination is also a convenient method of making multi-ply structures from the poly(urea-amides) and a great variety of polymers which may be combined in various gauges and sequences. Some of the polymers which may be combined with the poly(urea-amides) of this invention to provide multi-ply structures are:

Cellophane,
Cellulose acetate, cellulose acetate butyrate, and other cellulose esters,
Poly(ethylene-co-vinyl acetate),
Poly(chlorotrifluoroethylene),
Poly(ethylene-co-chlorotrifluoroethylene),
Ionomers from poly(ethylene-co-methacrylic acid),
Polyamides (such as nylon 6; nylon 6,6; nylon 12),
Polycarbonates (such as bisphenol A polycarbonate),
Poly(ethylene terephthalate),
Poly(butylene terephthalate),
Terephthalate copolyesters of ethylene glycol and cyclohexanedimethanol,
Terephthalate-isophthalate copolyesters of cyclohexanedimethanol,
Polyethylene (ranging from low-density to high-density and including the linear low-density polyethylene),
Polypropylene and the plastic-grade ethylenepropylene copolymers,
Poly(1-butene),
Poly(vinyl chloride),
Poly(vinylidene chloride-co-vinyl chloride),
Poly(ethylene-co-vinyl alcohol),
Poly(ethylene-co-vinyl alcohol-co-vinyl acetate),
Poly(acrylonitrile-co-styrene), and
Poly(acrylonitrile-co-methyl methacrylate).

In general, any film-forming polymer may be used in preparing the multi-ply laminates of this invention. The selection will depend upon the properties desired in the final laminated structure.

Tough films are obtained by pressing or by extrusion. Molded articles having good properties are obtained by injection molding at about 240°–300° C., depending on the melting point of the poly(urea-amide). In addition to such films and molded articles, the present polymers are useful as foamed plastics, fibers, and coatings. The polymers can be compounded in conventional manner with such additives as nucleating agents, organic fibers, pigments, fillers, glass fibers, antioxidants, plasticizers, lubricants, and the like.

Especially useful articles manufactured in accordance with the present invention are films of a poly(urea-amide) of claim 1 having an I.v. of above about 0.6 wherein the film has an $O_2$ permeability at 30° C. and 68% relative humidity of less than 0.5 cc-mil/100 in.$^2$—24 hr.—atm., and a thickness of from about 0.2 to about 10 mils. Most preferred are these articles wherein the poly(urea-amide) is prepared from m-xylylenediamine, a carbonate, and at least about 80 mol % adipic acid as the dicarboxylic acid component. These films are useful by themselves or laminated with the aforesaid polymers.

The invention can be further understood by reference to the following specific examples which are not intended to limit the invention, but merely to illustrate the same.

All inherent viscosities (I.V.) are determined according to ASTM D2857-70, in a Wagner Viscometer having a 0.5 ml. capillary bulb, at 25° C. in a 40/35/25 weight mixture of p-chorophenol/tetrachloroethane/phenol at a polymer concentration of 0.1 g/100 ml. The melting points and glass transition temperatures are determined with a Perkin-Elmer DSC-2 differential scanning calorimeter. The oxygen permeabilities are determined with an Oxtran 100 (Mocon Instrument) at 30° C. and 68% RH (relative humidity).

EXAMPLE 1

This example illustrates the preparation of a poly(urea-amide) from m-xylylenediamine, 80 mol % adipic acid and 20 mol % diphenyl carbonate using a two-step process. A mixture of 17.52 g (0.12 mol) of adipic acid and 20.6 g (0.15 mol) of m-xylylenediamine is placed in a 100 ml flask equipped with a stirrer, polymer head, nitrogen line, take-off tube, and suction flask. The mixture is heated under a nitrogen atmosphere with stirring at 195° C. until the water is distilled from the flask (60 min.). The oligomer is then allowed to cool to room temperature, and 6.42 g (0.03 mol) of diphenyl carbonate is added to the flask. The mixture is then heated to 225° C. and phenol begins to distill slowly from the flask. After about 20 minutes a very viscous melt is obtained and the temperature of the bath is increased to 275° C. and held for 30 minutes. A vacuum of 10 mm of mercury is then applied over a period of 10 minutes, and after a period of 15 minutes the pressure is reduced to 0.3 mm of mercury for 35 minutes. A very high melt viscosity, clear, light yellow polymer is obtained. The polymer has an inherent viscosity of 0.68, a glass transition temperature of 84° C. and a crystalline melting point of 214° C. A film thereof pressed at 275° C. is light yellow, clear and creaseable. An injection molded bar thereof has a tensile strength of 12,270 psi, elongation of 9%, and flexural modulus of $5.7 \times 10^5$ psi. The oxygen and carbon dioxide permeabilities of an extruded film at 30° C. and 68% relative humidity are 0.35 and 2.23 cc-mil/100 in.$^2$—24 hr.—atm., respectively.

EXAMPLE 2

In this example, the reactants of Example 1 are used in a one-step process. A mixture of 17.52 g (0.12 mol) adipic acid, 20.6 g (0.15 mol) m-xylylenediamine and 6.42 g (0.03 mol) diphenyl carbonate is placed in a 100 ml flask equipped with a stirrer, polymer head, nitrogen line, take-off tube and suction flask. The mixture is heated under a nitrogen atmosphere with stirring at 195° C. for 30 minutes. The temperature of the bath is then increased to 240° C. and held for another 30 minutes. Finally, the temperature is increased to 275° C. and held for 15 minutes. A vacuum of 10 mm of mercury is then applied over a period of 10 minutes, and after a period of 15 minutes the pressure is reduced to 0.3 mm of mercury for 45 minutes. A very high melt viscosity, clear, light yellow polymer is obtained. The polymer has an inherent viscosity of 0.66, a glass transition temperature of 85° C., and a crystalline melting point of 214° C. A film pressed at 275° C. is light yellow, clear and creaseable. The oxygen permeability of an extruded film is 0.40 cc mil/100 in.$^2$—24 hr—atm.

EXAMPLE 3

The procedure described in Example 1 is used to prepare a series of copolymers from m-xylylenediamine, and varous amounts of adipic acid and diphenyl carbonate as shown by the following table. Films of the copolymers have low oxygen and carbon dioxide permeabilities.

| Adipic Acid, Mol % | I.V.$^a$ | Tg, °C.$^b$ | Tm, °C.$^c$ |
|---|---|---|---|
| 0$^d$ | Insoluble | — | 330 |
| 20$^d$ | Insoluble | 113 | 310 |
| 40 | 0.45 | 106 | None |
| 60 | 0.60 | 97 | None |
| 70 | 0.85 | 90 | None |
| 80 | 0.66 | 84 | 214 |
| 90 | 0.93 | 85 | 209 |
| 100 | 1.0 | 65 | 235 |

$^a$Inherent viscosity
$^b$Glass transition temperature
$^c$Melting point
$^d$Prepared by solid-state polymerization

EXAMPLE 4

The procedure of Example 1 is used (except the vacuum is applied at 285° C. instead of 275° C.) to prepare a copolymer with 0.08 mol (40 mol %) isophthalic acid, 0.12 mol (60 mol %) diphenyl carbonate and 0.20 mol (100 mol %) m-xylylenediamine. A high melt viscosity, clear, yellow polymer with an inherent viscosity of 0.63 and a glass transition temperature of 148° C. is obtained.

EXAMPLE 5

This example illustrates the preparation of a poly(urea-amide) using azelaic acid (30 mol %). The procedure of Example 1 is used (except the vacuum is applied at 295° C. instead of 275° C.) to prepare a copolymer with 0.045 mol (30 mol %) azelaic acid, 0.15 mol (100 mol %) m-xylylenediamine and 0.105 mol (70 mol %) diphenyl carbonate. A very high melt viscosity, clear yellow polymer is obtained. The polymer has an inherent viscosity of 0.46, a glass transition temperature of 99° C. and a melting point of 260° C. A creaseable film can be pressed easily at 295° C.

EXAMPLE 6

This example illustrates the preparation of a poly(urea-amide) using 80 mol % azelaic acid. The procedure in Example 2 is used to prepare a polymer with 0.12 mol (80 mol %) azelaic acid, 0.03 mol (20 mol %) diphenyl carbonate, and 0.15 mol (100 mol %) m-xylylenediamine. A medium melt viscosity, clear, pale yellow polymer is obtained. The polymer has an inherent viscosity of 0.95 and a glass transition temperature of 65° C. A creaseable film can be pressed easily at 260° C.

EXAMPLE 7

This example and Example 7A illustrate the preparation of poly(urea-amides) using glutaric acid (30 and 50 mol %). The procedure of Example 1 is used (except the vacuum is applied at 295° C. instead of 275° C.) to prepare a copolymer with 0.045 mol (30 mol %) glutaric acid, 0.15 mol (100 mol %) m-xylylenediamine and 0.105 mol (70 mol %) diphenyl carbonate. A very high melt viscosity, clear yellow polymer is obtained. The polymer has an inherent viscosity of 0.48 and a glass transition temperature of 115° C. A film can be pressed easily at 295° C.

EXAMPLE 7A

The procedure of Example 2 is used (except the vacuum is applied at 275° C. instead of 295° C.) to prepare a polymer with 0.075 mol (50 mol %) glutaric acid, 0.075 mol (50 mol %) diphenyl carbonate and 0.15 mol (100 mol %) m-xylylenediamine. A clear, light yellow polymer is obtained with an I.V. of 0.40 and a Tg of 105° C. A film can be pressed at 275° C.

EXAMPLE 8

This example illustrates preparation of poly(urea-amide) in which a portion (30 mol %) of the m-xylylenediamine is replaced with p-xylylene diamine. The procedure of Example 1 is used to prepare a polymer with 0.12 mol (80 mol %) adipic acid, 0.03 mol (20 mol %) diphenyl carbonate, 0.105 mol (70 mol %) m-xylylenediamine and 0.045 mol (30 mol %) p-xylylenediamine. A high melt viscosity, clear, yellow polymer is obtained. A creaseable film can be pressed at 275° C.

EXAMPLE 9

This example illustrates the preparation of a poly(urea-amide) using dibutyl carbonate instead of diphenyl carbonate. A mixture of 20.4 g (0.15 mol) of m-xylylenediamine and 10.9 g (0.075 mol) of adipic acid is placed in a 100-ml flask equipped with a stirrer, polymer head, nitrogen line, take-off tube and a suction flask. The mixture is heated under a nitrogen atmosphere with stirring at 195° C. until the water has distilled from the flask (60 min.). The oligomer is then allowed to cool to room temperature and 13 g (0.075 mol) of dibutyl carbonate is added to the flask. The mixture is then heated at 195° C. at which time butanol begins to distill slowly from the flask. After 3 hours the temperature of the bath is increased to 225° C. and held for 1 hour. The temperature of the bath is then increased to 285° C. and vacuum applied over a period of 30 minutes. A vacuum of 0.5 mm of mercury is reached and maintained for 2½ hours. A high melt viscosity, clear, amber polymer is obtained. The polymer has an inherent viscosity of 0.40 and glass transition temperature of 93° C. A clear film can be easily pressed at 285° C.

EXAMPLE 10

This example and Example 10A illustrate the preparation of polymers containing 1,12-dodecanedioic acid (20 and 90 mol %). The procedure in Example 2 is used to prepare a poly(urea-amide) with 0.12 mol (80 mol %) diphenyl carbonate, 0.03 mol (20 mol %) 1,12-dodecanedioic acid, and 0.15 mol (100 mol %) m-xylylenediamine. The prepolymer is ground to pass a 20-mesh screen. Solid-state polymerization of the prepolymer is accomplished by heating the particles under reduced pressure (0.1 mm Hg) at 240° C. for five hours. The polymer has a glass transition temperature of 103° C. and a melting point of 309° C.

EXAMPLE 10A

The procedure of Example 2 is used to prepare a poly(urea-amide) with 0.09 mol (90 mol %) 1,12-dodecanedioic acid, 0.01 mol (10 mol %) diphenyl carbonate and 0.10 mol (100 mol %) m-xylylenediamine. A high melt viscosity, clear, light yellow polymer is obtained. The polymer has an inherent viscosity of 0.79, glass transition temperature of 53° C. and a melting point of 179° C. The polymer can be easily pressed at 260° C. to yield a tough, creaseable film.

The invention has been described in detail with particular reference to preferred embodiments thereof, but it will be understood that variations and modifications will be effected within the spirit and scope of the invention.

We claim:

1. A poly(urea-amide) having an inherent viscosity of 0.4 to about 1.2 determined according to ASTM D2857-70, in a Wagner Viscometer having a 0.5 ml. capillary bulb, at 25° C. in a 40/35/25 weight mixture of p-chlorophenol/tetrachloroethane/phenol at a polymer concentration of 0.1 g/100 ml., and having special utility in the manufacture of film having greatly improved resistance to $o_2$ permeability, comprised of the repeating units

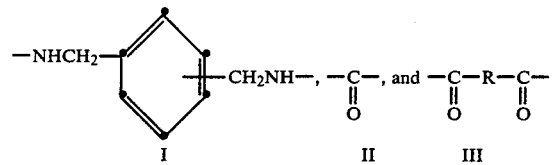

wherein with respect to the total moles of II and III, the mol % of II is 5 to 80, R is unsubstituted straight chain alkylene of 3 to 10 carbons with the proviso that when R contains 3 carbons, not over 50 mol % thereof is present or up to 40 mol % of R is aromatic, and wherein up to 30 mol % of I is the para isomer, the remainder being the meta isomer.

2. The poly(urea-amide) of claim 1 wherein the mol % of II is 20 to 60, R is unsubstituted straight chain alkylene of 4 carbons, and wherein I is the meta isomer.

3. The poly(urea-amide) of claim 1 wherein the mol % of II is 20–30, R is comprised of 0–30 mol % glutaric and 100–70 mol % adipic, and wherein I is the meta isomer.

4. A film of a poly(urea-amide) of claim 1 having an inherent viscosity of above about 0.6, wherein the film has an O₂ permeability at 30° C. and 68% relative humidity of less than 0.5 cc-mil/100 in.²—24 hr.—atm.

5. A film according to claim 4 wherein the poly(ureaamide) is prepared from m-xylylenediamine, a carbonate, and at least about 70 mol % adipic acid as the dicarboxylic acid component.

6. The film of claim 4 or 5 laminated to a polymeric substrate.

* * * * *